(12) United States Patent
Kato

(10) Patent No.: US 12,488,685 B2
(45) Date of Patent: Dec. 2, 2025

(54) VEHICLE EXTERNAL ENVIRONMENT DETECTION SYSTEM AND VEHICLE

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 215 days.

(21) Appl. No.: 18/466,152

(22) Filed: Sep. 13, 2023

(65) Prior Publication Data

US 2024/0119832 A1  Apr. 11, 2024

(30) Foreign Application Priority Data

Oct. 6, 2022 (JP) ................. 2022-161816

(51) Int. Cl.
*G08G 1/0967* (2006.01)
*B60W 30/18* (2012.01)
(Continued)

(52) U.S. Cl.
CPC ........... *G08G 1/0967* (2013.01); *G06V 20/58* (2022.01); *G08G 1/005* (2013.01); *G08G 1/166* (2013.01);
(Continued)

(58) Field of Classification Search
CPC ...... G08G 1/0967; G08G 1/005; G08G 1/166; G06V 20/58; G06V 40/25; B60W 50/14; B60W 2556/65; B60W 30/18154
See application file for complete search history.

(56) References Cited

U.S. PATENT DOCUMENTS 8,195,394 B1 * 6/2012 Zhu ................. G08G 1/09626
382/107
9,381,916 B1 * 7/2016 Zhu ................. B60W 30/0956
(Continued)

FOREIGN PATENT DOCUMENTS

CN   110544390 A  * 12/2019  ....... G08G 1/096725
JP   2020-177494 A   10/2020

OTHER PUBLICATIONS

Translation of CN-110544390-A, 9 pages (Year: 2019).*

*Primary Examiner* — Dale W Hilgendorf
(74) *Attorney, Agent, or Firm* — Rimon P.C.

(57) ABSTRACT

A vehicle external environment detection system includes a first vehicle and a second vehicle. The first vehicle includes an image sensor, a first processing circuit, and a first communication circuit. The first processing circuit identifies a moving method of a person around the first vehicle based on a result of the imaging performed by the image sensor, estimates a person's moving speed based on the moving method, and calculates an arrival time at which the person arrives at an intersection based on the person's moving speed. The first communication circuit transmits notification data including data regarding the arrival time. The second communication circuit receives the notification data. The second processing circuit calculates an interference possibility between the second vehicle and the person based on the data regarding the arrival time included in the notification data and warns an occupant on the second vehicle when the interference possibility is high.

5 Claims, 14 Drawing Sheets

(51) Int. Cl.
*B60W 50/14* (2020.01)
*G06V 20/58* (2022.01)
*G06V 40/20* (2022.01)
*G08G 1/005* (2006.01)
*G08G 1/16* (2006.01)

(52) U.S. Cl.
CPC ....... *B60W 30/18154* (2013.01); *B60W 50/14* (2013.01); *B60W 2556/65* (2020.02); *G06V 40/25* (2022.01)

(56) References Cited

U.S. PATENT DOCUMENTS

| | | | | |
|---|---|---|---|---|
| 10,891,864 B2 * | 1/2021 | Kim | ..................... | G08G 1/0125 |
| 11,259,159 B2 * | 2/2022 | Mielenz | ................ | H04W 76/15 |
| 11,300,957 B2 * | 4/2022 | Wray | ................... | G05D 1/0088 |
| 11,500,380 B2 * | 11/2022 | Wray | ............... | G08G 1/096708 |
| 11,518,371 B2 * | 12/2022 | Amoli | .................... | G06V 40/67 |
| 11,710,407 B2 * | 7/2023 | Nagata | .............. | B60W 30/0956 |
| | | | | 382/104 |
| 11,782,438 B2 * | 10/2023 | Bentahar | ............... | B60W 30/08 |
| | | | | 701/27 |
| 2009/0237269 A1 * | 9/2009 | Okugi | .................... | G08G 1/166 |
| | | | | 340/901 |
| 2011/0102195 A1 * | 5/2011 | Kushi | .............. | G08G 1/096783 |
| | | | | 340/905 |
| 2013/0181823 A1 * | 7/2013 | Stahlin | ................... | G08G 1/166 |
| | | | | 340/436 |
| 2013/0197736 A1 * | 8/2013 | Zhu | ..................... | G05D 1/0088 |
| | | | | 701/26 |
| 2018/0096605 A1 * | 4/2018 | Bai | ...................... | B60Q 9/008 |
| 2019/0023239 A1 * | 1/2019 | Fujita | ...................... | G08G 1/16 |
| 2019/0033876 A1 * | 1/2019 | Aoki | ................ | B60W 30/0956 |
| 2019/0333380 A1 * | 10/2019 | Kobayashi | ............... | G08G 1/04 |
| 2020/0333791 A1 * | 10/2020 | Inoue | .................. | G01C 21/3492 |
| 2021/0270617 A1 * | 9/2021 | Spielman | ............ | G01C 21/3423 |
| 2022/0009483 A1 * | 1/2022 | McGill | .................. | G06F 9/5027 |
| 2022/0169245 A1 * | 6/2022 | Hieida | .................. | G08G 1/162 |
| 2022/0406186 A1 * | 12/2022 | Watanabe | .............. | G06V 20/56 |

* cited by examiner

| ITEM | PARAMETER |
|---|---|
| MOVING METHOD: WALKING | 01: YES<br>02: NO |
| HEIGHT | 180 [cm] |
| MOVING METHOD: BICYCLE | 01: YES<br>02: NO |
| MOVING METHOD: MOBILITY SCOOTER | 01: YES<br>02: NO |
| MOVING METHOD: ANY BOARD | 01: YES<br>02: NO |
| MOVING DIRECTION OF PERSON | 01: TOWARD VEHICLE 10A<br>02: DIRECTION AWAY FROM VEHICLE 10A |
| DISTANCE BETWEEN PERSON AND INTERSECTION | 30 [m] |
| ARRIVAL TIME OF PERSON | 20220603160145I0 |
| TRAVELING DIRECTION OF VEHICLE 10A | 90 [deg] |
| IDENTIFICATION INFORMATION OF INTERSECTION | LATITUDE AND LONGITUDE |

FIG. 6

| ITEM | PARAMETER |
|---|---|
| MOVING METHOD: WALKING | 01: YES<br>02: NO |
| HEIGHT | 180 [cm] |
| MOVING METHOD: BICYCLE | 01: YES<br>02: NO |
| MOVING METHOD: MOBILITY SCOOTER | 01: YES<br>02: NO |
| MOVING METHOD: ANY BOARD | 01: YES<br>02: NO |
| MOVING DIRECTION OF PERSON | 270 [deg] |
| DISTANCE BETWEEN PERSON AND INTERSECTION | 30 [m] |
| ARRIVAL TIME OF PERSON | 2022060316014510 |
| IDENTIFICATION INFORMATION OF INTERSECTION | LATITUDE AND LONGITUDE |

FIG. 12

VEHICLE EXTERNAL ENVIRONMENT DETECTION SYSTEM AND VEHICLE

CROSS-REFERENCE TO RELATED APPLICATIONS

The present application claims priority from Japanese Patent Application No. 2022-161816 filed on Oct. 6, 2022, the entire contents of which are hereby incorporated by reference.

BACKGROUND

The disclosure relates to a vehicle external environment detection system that detects an environment outside a vehicle and to a vehicle to be used in such a vehicle external environment detection system.

Some vehicles detect a vehicle external environment such as a person outside a vehicle and notify an occupant of a detection result. For example, Japanese Unexamined Patent Application Publication No. 2020-177494 discloses a technique regarding a vehicle that evaluates a risk based on a vehicle external environment.

SUMMARY

An aspect of the disclosure provides a vehicle external environment detection system including a first vehicle and a second vehicle. The first vehicle includes an image sensor, a first processing circuit, and a first communication circuit. The image sensor is configured to perform imaging of a surrounding region. The first processing circuit is configured to identify a moving method of a person around the first vehicle based on a result of the imaging performed by the image sensor, estimate a moving speed of the person based on the moving method, and calculate an arrival time at which the person arrives at an intersection based on the moving speed of the person. The first communication circuit is configured to transmit notification data including data regarding the arrival time. The second vehicle includes a second communication circuit and a second processing circuit. The second communication circuit is configured to receive the notification data. The second processing circuit is configured to calculate a possibility of interference between the second vehicle and the person based on the data regarding the arrival time included in the notification data and warn an occupant on the second vehicle when the possibility of the interference is high.

An aspect of the disclosure provides a vehicle including an image sensor, a first processing circuit, and a first communication circuit. The image sensor is configured to perform imaging of a surrounding region. The first processing circuit is configured to identify a moving method of a person around the vehicle based on a result of the imaging performed by the image sensor, estimate a moving speed of the person based on the moving method, and calculate an arrival time at which the person arrives at an intersection based on the moving speed of the person. The first communication circuit is configured to transmit notification data including data regarding the arrival time.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 6 is a table illustrating an example configuration of notification data illustrated in FIG. 1.

FIG. 12 is a table illustrating an example configuration of notification data according to another modification.

DETAILED DESCRIPTION

Figure 1:
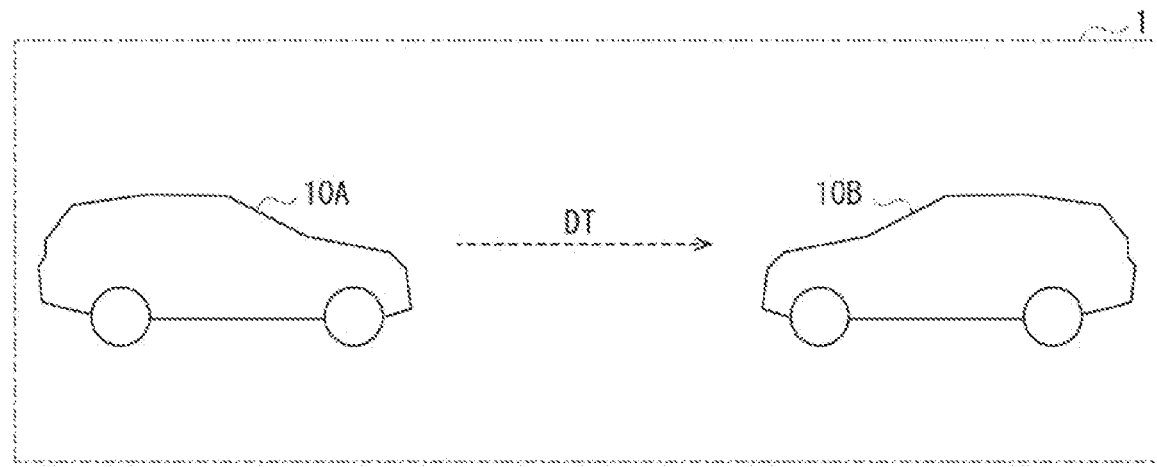
FIG. 1 is a configuration diagram illustrating an example configuration of a vehicle external environment detection system according to one example embodiment of the disclosure.

It is desirable that a vehicle appropriately detect a vehicle external environment, and more appropriate detection of the vehicle external environment is expected.

It is desirable to provide a vehicle external environment detection system and a vehicle that make it possible to detect a vehicle external environment more appropriately.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

Example Configuration

Figure 2:
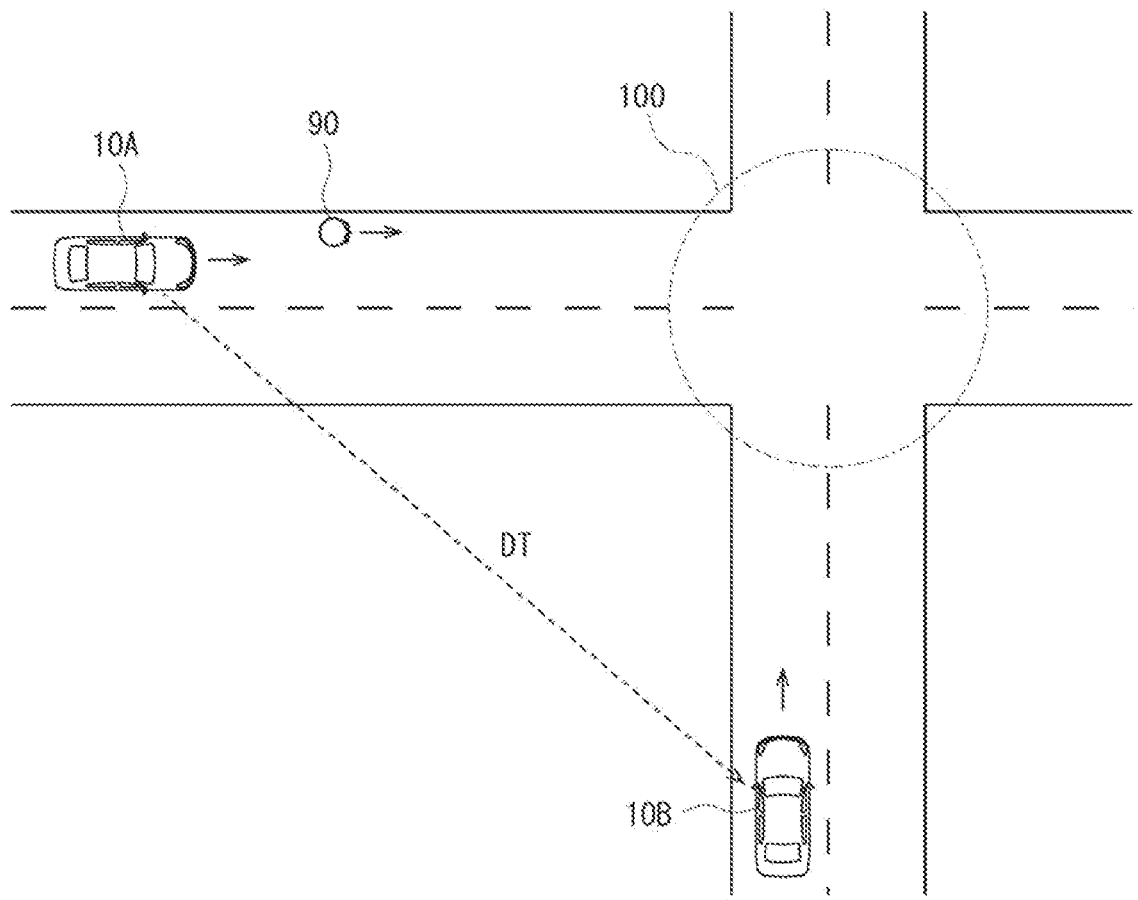
FIG. 2 is an explanatory diagram illustrating an example operation of the vehicle external environment detection system illustrated in FIG. 1.

FIG. 1 illustrates an example configuration of a vehicle external environment detection system (vehicle external environment detection system 1) according to an example embodiment. The vehicle external environment detection system 1 may include multiple vehicles 10. In this example, the vehicle external environment detection system 1 includes two vehicles 10A and 10B. The vehicle 10 may include, for example, an automobile. FIG. 2 illustrates an example operation of the vehicle external environment detection system 1.

In the vehicle external environment detection system 1, the vehicle 10A may detect, for example, a person 90 who is moving toward an intersection 100. The vehicle 10A may estimate a time (an arrival time) at which the person 90 arrives at the intersection 100. The vehicle 10A may perform vehicle-to-vehicle communication to transmit notification data DT including data regarding the arrival time to a vehicle around the vehicle 10A. The vehicle 10B may receive the notification data DT. The vehicle 10B may grasp the fact that the person 90 is moving toward the intersection 100 based on the notification data DT. Thereafter, the vehicle 10B may estimate a possibility (a possibility of interference) that the vehicle 10B interferes with the person 90. If the possibility of interference is high, the vehicle 10B may warn an occupant on the vehicle 10B. Thus, the vehicle external environment detection system 1 makes it possible for the vehicle 10B to grasp the existence of the person 90 based on the notification data DT even when, for example, the intersection 100 has bad visibility, making it difficult for the vehicle 10B to directly detect the person 90.

Figure 3:
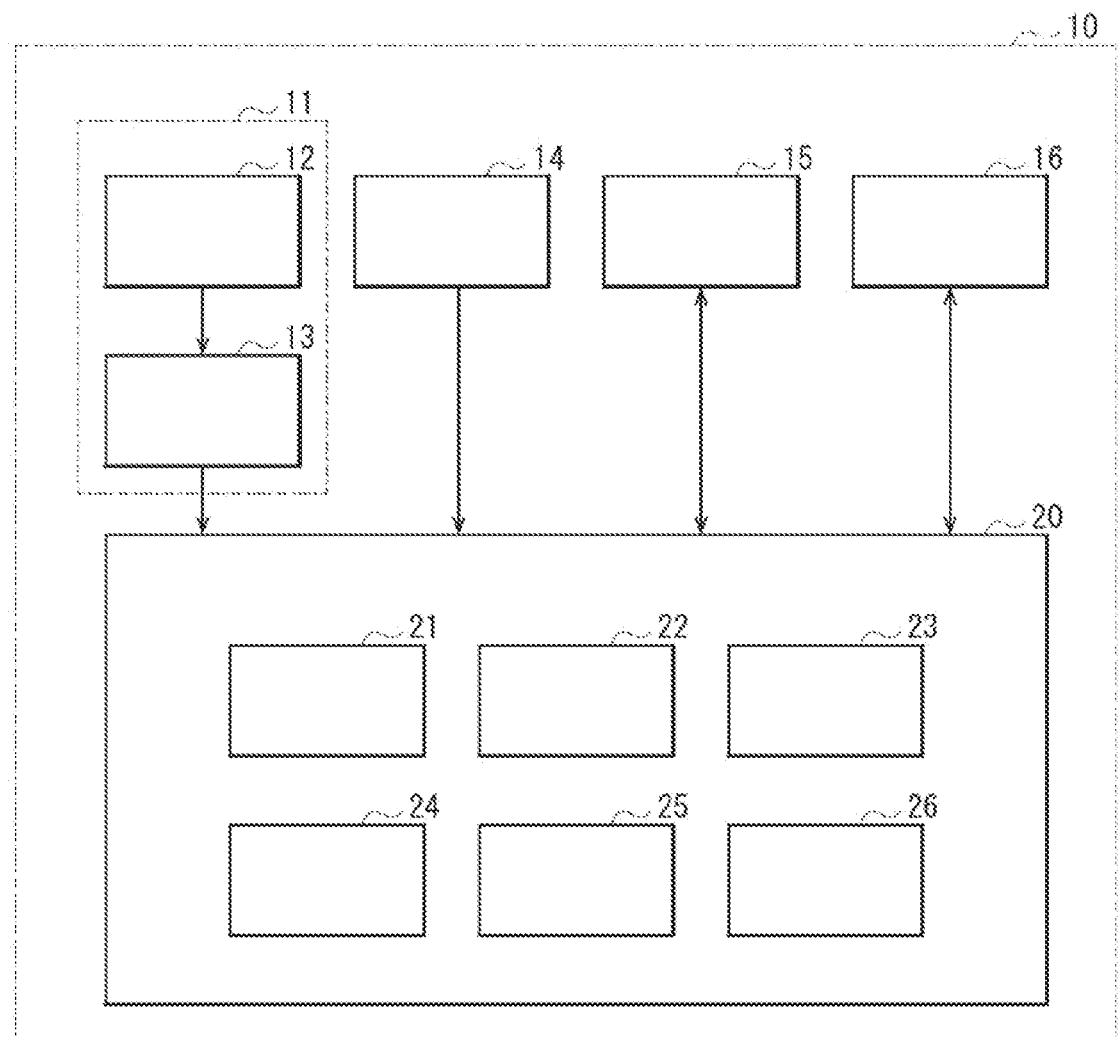
FIG. 3 is a block diagram illustrating an example configuration of a vehicle illustrated in FIG. 1.
Figure 4A:
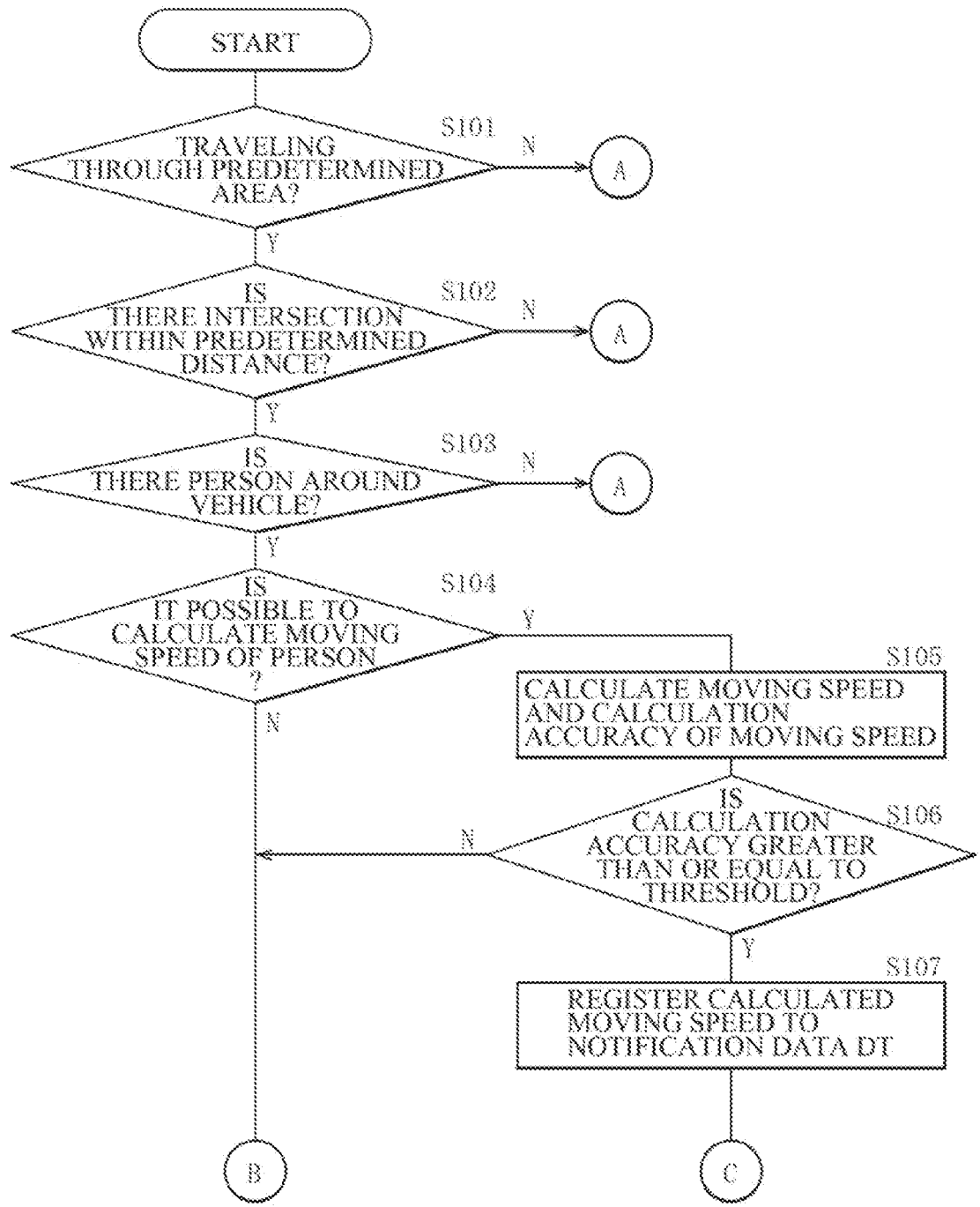
FIG. 4A is a flowchart illustrating an example operation of the vehicle external environment detection system illustrated in FIG. 1.
Figure 4B:
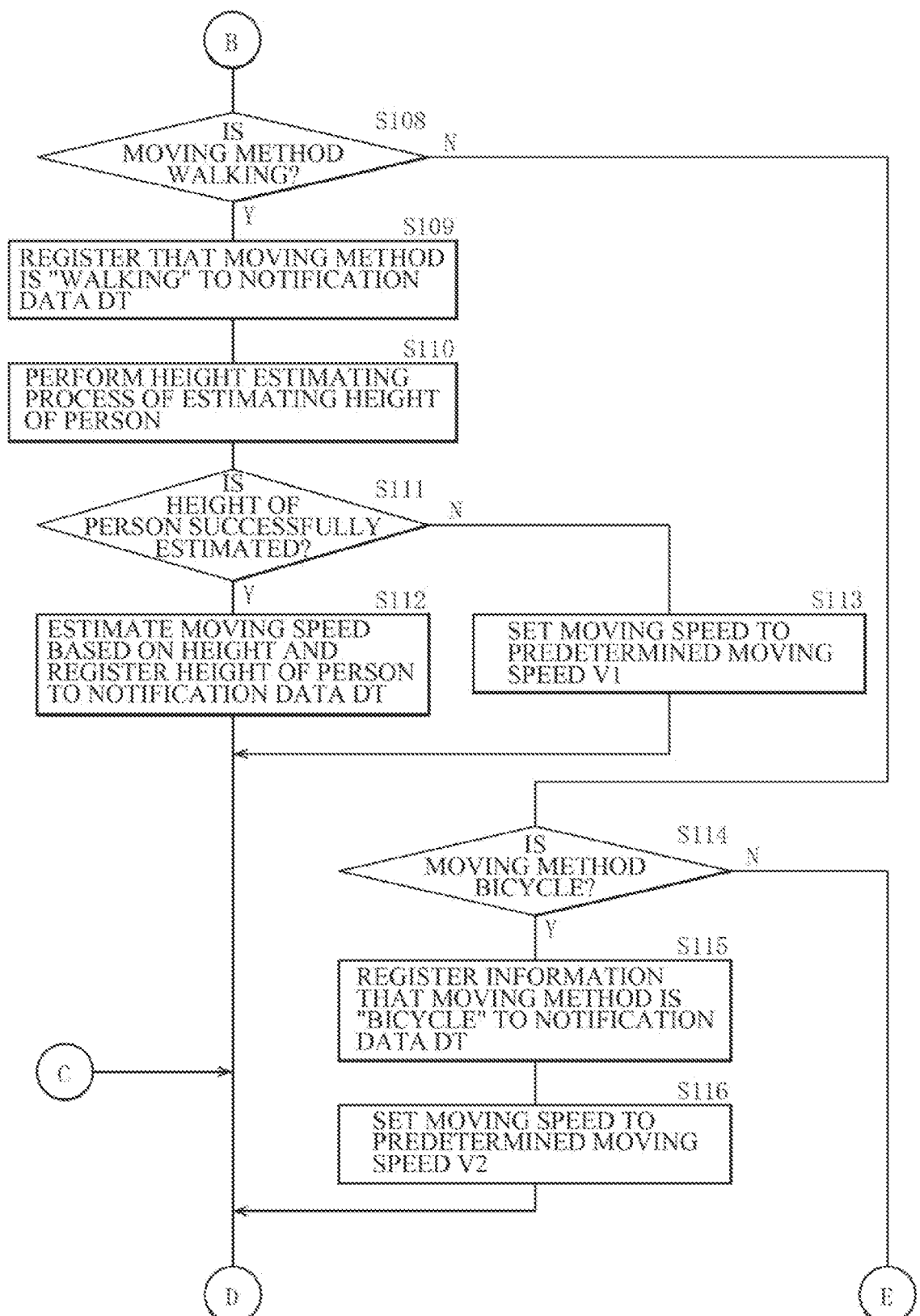
FIG. 4B is another flowchart illustrating the example operation of the vehicle external environment detection system illustrated in FIG. 1.
Figure 4C:
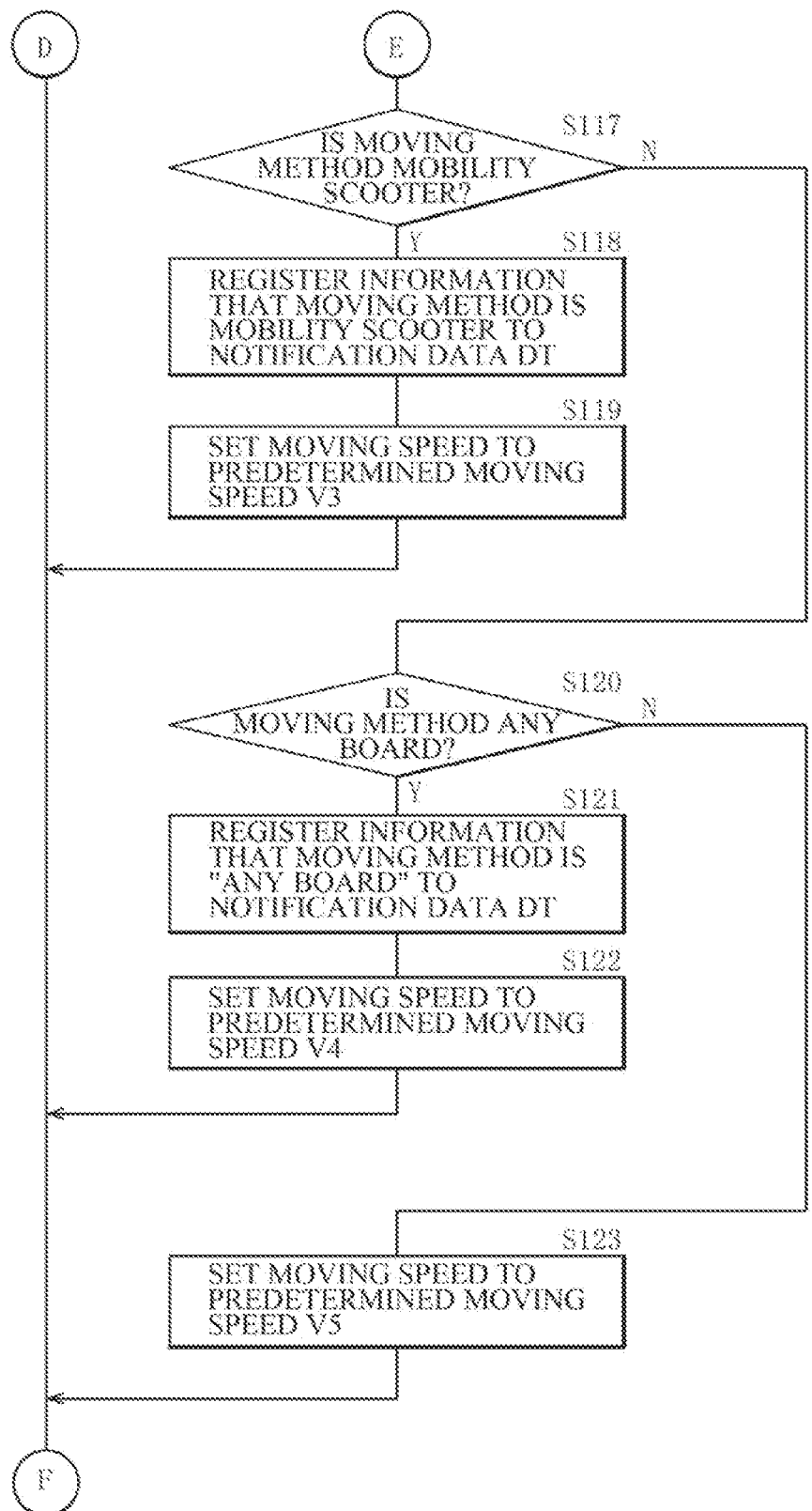
FIG. 4C is another flowchart illustrating the example operation of the vehicle external environment detection system illustrated in FIG. 1.
Figure 4D:
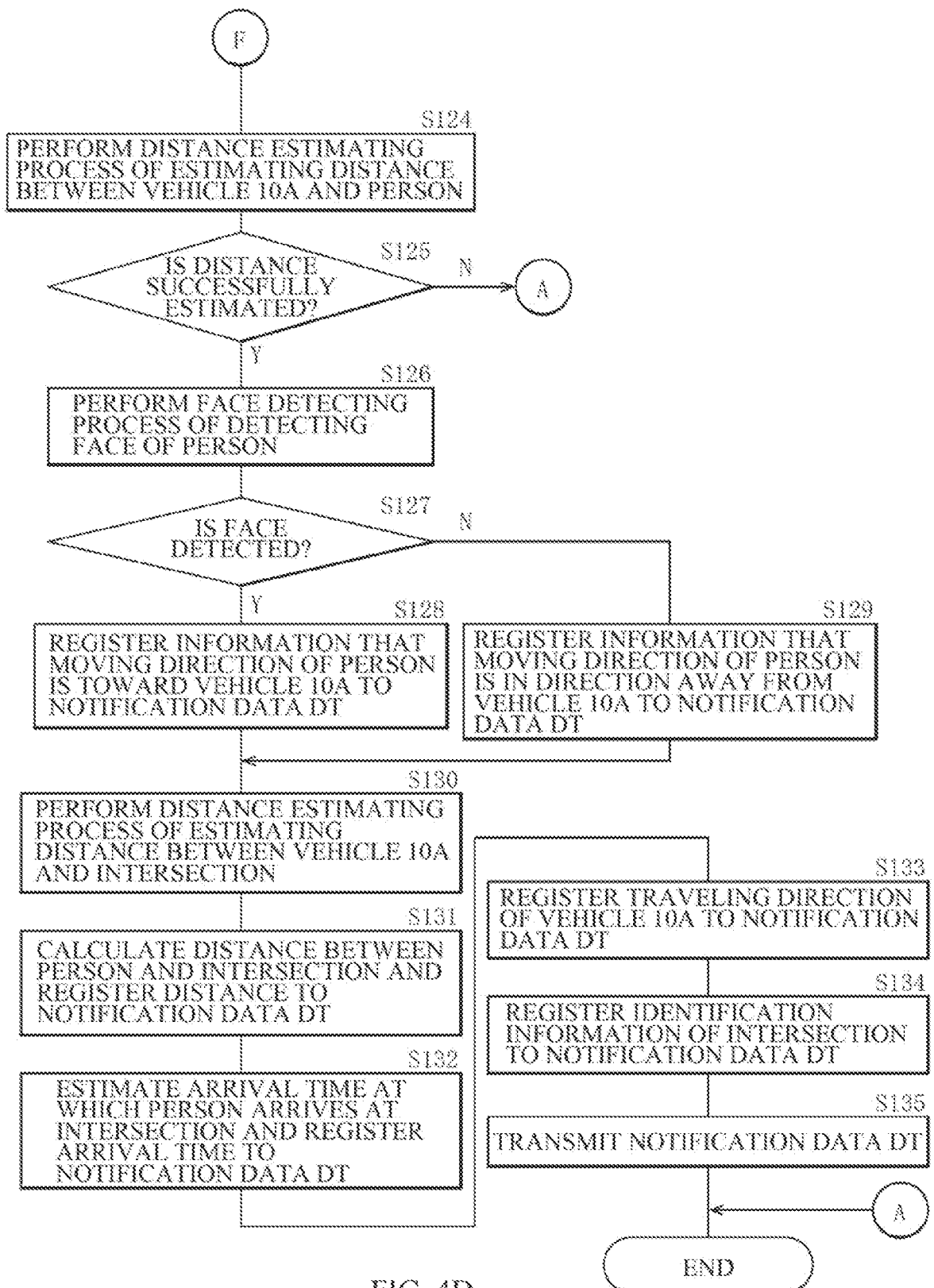
FIG. 4D is another flowchart illustrating the example operation of the vehicle external environment detection system illustrated in FIG. 1.

FIG. 3 illustrates an example configuration of the vehicle 10. Each of the vehicles 10A and 10B may be configured as illustrated in FIG. 3. The vehicle 10 may include a navigator 11, an imaging unit 14, a communicator 15, a user interface 16, and a processor 20.

The navigator 11 may be configured to determine a route to a destination (a scheduled traveling route) on which the vehicle 10 is to travel. The navigator 11 may be configured to provide a driver who drives the vehicle 10 with information to thereby guide the vehicle 10 along the determined route. The navigator 11 may include a global navigation satellite system (GNSS) receiver 12 and a navigation processor 13. The GNSS receiver 12 may be configured to acquire a position of the vehicle 10 on the ground using a GNSS such as a global positioning system (GPS). The navigation processor 13 may determine the scheduled traveling route of the vehicle 10 using a map information database including information regarding a road map. The navigation processor 13 may include, for example, a storage that stores the map information database, and determine the scheduled traveling route using the map information database stored in the storage. Alternatively, the navigation processor 13 may include, for example, a communicator that communicates with a network server storing the map information database, and determine the scheduled traveling route based on the information acquired from the network server. The navigator 11 may determine the scheduled traveling route to the destination based on, for example, information regarding the destination entered by the driver by operating the user interface 16, which will be described later. The navigator 11 may provide the driver with the information regarding the determined route using the user interface 16. Furthermore, the navigation processor 13 may supply data regarding the position of the vehicle 10 and an intersection around the vehicle 10 to the processor 20 based on the map information database.

The imaging unit 14 may be configured to generate captured images by performing imaging, i.e., capturing images, of a surrounding region of the vehicle 10. In this example, the imaging unit 14 may include a stereo camera that captures images of a region ahead of the vehicle 10. Note that this example is a non-limiting example, and the vehicle 10 may include a monocular camera that captures images of a region ahead of the vehicle 10. Additionally, the imaging unit 14 may further include a camera that captures images of a region sideways or rearward of the vehicle 10. The imaging unit 14 may supply the captured images to the processor 20.

The communicator 15 may be configured to perform the vehicle-to-vehicle communication with a vehicle around the vehicle 10. For example, the communicator 15 may communicate with a vehicle around the vehicle 10 using, for example, vehicle-to-everything (V2X) communication or a cellular network (mobile communications).

The user interface 16 may include, for example, a display panel, a touch panel, and various buttons. The user interface 16 may be configured to receive operation of a user and provide information to the user.

The processor 20 may be configured to perform a process of generating the notification data DT based on data supplied from the navigator 11 and the imaging unit 14 and causing the communicator 15 to transmit the notification data DT and a process of warning the occupant based on the notification data DT received by the communicator 15. The processor 20 may include, for example, one or more processors and one or more memories. The processor 20 may include an intersection detector 21, a person detector 22, an arrival time estimator 23, a notification data generator 24, an interference possibility estimator 25, and a warning processor 26.

The intersection detector 21 may be configured to detect an intersection around the vehicle 10 based on the data supplied from the navigator 11.

The person detector 22 may be configured to detect a person near the intersection, detect a moving method of the person, and estimate a moving speed of the person based on the captured images supplied from the imaging unit 14.

The arrival time estimator 23 may be configured to estimate the arrival time at which the person detected by the person detector 22 arrives at the intersection detected by the intersection detector 21.

The notification data generator 24 may be configured to generate the notification data DT including the data regarding the arrival time estimated by the arrival time estimator 23.

The interference possibility estimator 25 may be configured to estimate the possibility (the possibility of interference) that the vehicle 10 interferes with the person at the intersection based on the notification data DT received by the communicator 15.

The warning processor 26 may be configured to warn the occupant on the vehicle 10 if the possibility of interference calculated by the interference possibility estimator 25 is high. For example, the warning processor 26 may control operation of the user interface 16 to cause the user interface 16 to provide the occupant with information indicating that there is a high possibility of interference between the vehicle 10 and the person at the intersection.

In one embodiment, the vehicle 10A may serve as a "first vehicle". In one embodiment, the imaging unit 14 of the vehicle 10A may serve as an "image sensor". In one embodiment, the processor 20 of the vehicle 10A may serve as a "first processing circuit". In one embodiment, the communicator 15 of the vehicle 10A may serve as a "first communication circuit". In one embodiment, the processor 20 of the vehicle 10A may serve as a "processing circuit". In one embodiment, the communicator 15 of the vehicle 10A may serve as a "communication circuit".

In one embodiment, the vehicle 10B may serve as a "second vehicle". In one embodiment, the communicator 15 of the vehicle 10B may serve as a "second communication circuit". In one embodiment, the processor 20 of the vehicle 10B may serve as a "second processing circuit".

[Operation and Workings]

An operation and workings of the vehicle external environment detection system 1 according to the example embodiment will now be described.

<Overview of Overall Operation>

First, an operation of the vehicle external environment detection system 1 will be described with reference to FIGS. 1 to 3.

In the vehicle 10A, the intersection detector 21 may detect an intersection around the vehicle 10A based on the data supplied from the navigator 11 of the vehicle 10A. The person detector 22 may detect a person, detect the moving method of the person, and estimate the moving speed of the person based on the captured images supplied from the imaging unit 14 of the vehicle 10A. The arrival time estimator 23 may estimate the arrival time at which the person detected by the person detector 22 arrives at the intersection detected by the intersection detector 21. The notification data generator 24 may generate the notification data DT including the data regarding the arrival time estimated by the arrival time estimator 23. The communicator 15 may transmit the notification data DT to the vehicle 10 around the vehicle 10A.

In the vehicle 10B, the communicator 15 may receive the notification data DT transmitted from the vehicle 10A. The intersection detector 21 may detect an intersection around the vehicle 10B based on the data supplied from the navigator 11 of the vehicle 10B. The interference possibility estimator 25 may calculate the possibility (the possibility of interference) that the vehicle 10B interferes with the person at the intersection detected by the intersection detector 21 based on the notification data DT received by the communicator 15. The warning processor 26 may warn the occupant on the vehicle 10B if the possibility of interference calculated by the interference possibility estimator 25 is high. Based on an instruction from the warning processor 26, the user interface 16 may provide the occupant with the information indicating that the possibility that the vehicle 10B interferes with the person at the intersection is high.

<Details of Operation>

The operation of the vehicle external environment detection system 1 will now be described in detail. A description is given of an example implementation where: the vehicle 10A generates the notification data DT upon detecting the person 90; and the vehicle 10B warns the occupant based on the notification data DT as illustrated in FIG. 2. First, the operation of the vehicle 10A will be described, and thereafter the operation of the vehicle 10B will be described.

<Operation of Vehicle 10A>

FIGS. 4A to 4D illustrate an example operation of the vehicle 10A. The vehicle 10A may repeat the processes illustrated in FIGS. 4A to 4D, for example, several times per second.

First, the intersection detector 21 may determine whether the vehicle 10A is traveling through a predetermined area (step S101). For example, the intersection detector 21 may determine whether the vehicle 10A is traveling through an area, such as an urban area, where there is a high possibility that a person and a vehicle interfere with each other at an intersection, based on the data regarding the position of the vehicle 10A supplied from the navigator 11. If the vehicle 10A is not traveling through the predetermined area ("N" in step S101), this process may end.

In step S101, if the vehicle 10A is traveling through the predetermined area ("Y" in step S101), the intersection detector 21 may determine whether there is an intersection in a region within a predetermined distance from the vehicle 10A (step S102). For example, the intersection detector 21 may determine whether there is an intersection in the region within the predetermined distance from the vehicle 10A based on the data regarding the position of the vehicle 10A and the position of the intersection around the vehicle 10A supplied from the navigator 11. If there is no intersection in the region within the predetermined distance from the vehicle 10A ("N" in step S102), this process may end.

In step S102, if there is an intersection in the region within the predetermined distance from the vehicle 10A ("Y" in step S102), the person detector 22 may determine whether there is a person around the vehicle 10A (step S103). For example, the person detector 22 may determine whether there is a person around the vehicle 10A based on the captured images supplied from the imaging unit 14 of the vehicle 10A. If there is no person around the vehicle 10A ("N" in step S103), this process may end.

In step S103, if there is a person around the vehicle 10A ("Y" in step S103), the person detector 22 may determine whether it is possible to calculate the moving speed of the person (step S104). For example, the person detector 22 may determine whether it is possible to calculate the moving speed of the person by determining, for example, whether an image quality of the captured images is high, whether the person is at a position near the vehicle 10A, or whether there is an obstacle between the vehicle 10A and the person, based on the captured images supplied from the imaging unit 14 of the vehicle 10A. If it is difficult for the person detector 22 to calculate the moving speed of the person ("N" in step S104), the flow may proceed to step S108.

If it is possible for the person detector 22 to calculate the moving speed of the person ("Y" in step S104), the person detector 22 may calculate the moving speed of the person and also a calculation accuracy of the moving speed (step S105).

For example, the person detector 22 may calculate the position of the person in a three-dimensional space based on, for example, each of two or more captured images captured at different points in time and including images of the person. In a case where the imaging unit 14 is a stereo camera, it is possible for the person detector 22 to calculate the position of the person by calculating a distance between the vehicle 10A and the person based on a parallax in a stereo image obtained by the stereo camera. Furthermore, in a case where the imaging unit 14 is a monocular camera, it is possible for the person detector 22 to calculate the position of the person based on the captured images and the data regarding the position supplied from the navigator 11. Although not illustrated, for example, in a case where the vehicle 10A includes a Light Detection and Ranging (LiDAR) sensor, it is possible for the person detector 22 to calculate the position of the person by calculating the distance between the vehicle 10A and the person based on the captured images and a detection result of the sensor. The person detector 22 may calculate the position of the person in the three-dimensional space based on each of two or more captured images in this manner. Thereafter, it is possible for the person detector 22 to calculate the moving speed of the person based on a change or changes in the position of the person obtained based on the two or more captured images.

Furthermore, the person detector 22 may calculate the calculation accuracy of the moving speed based on the captured images. That is, for example, captured images obtained at night hours, captured images obtained in a bad weather, and captured images obtained in a backlight environment can have a slightly low image quality, leading to low calculation accuracy of the moving speed. Furthermore, for example, if the person is far away, the accuracy in determining the position of the person based on the captured images can be low, leading to a low calculation accuracy of the moving speed. Furthermore, for example, if there is an obstacle between the vehicle 10A and the person, the accuracy in determining the position of the person based on the captured images can be low, leading to a low calculation accuracy of the moving speed. As described above, the calculation accuracy of the moving speed can be decreased in various cases. For this reason, the person detector 22 may calculate the calculation accuracy of the moving speed based on the captured images.

Thereafter, the person detector 22 may determine whether the calculation accuracy of the moving speed is greater than or equal to a predetermined threshold (step S106). If the calculation accuracy of the moving speed is greater than or equal to the predetermined threshold ("Y" in step S106), the person detector 22 may set the moving speed of the person to the moving speed calculated by the person detector 22 in step S105 (step S107). Thereafter, the flow may proceed to step S124.

In step S106, if the calculation accuracy of the moving speed is not greater than or equal to the predetermined threshold ("N" in step S106), the flow may proceed to step S108.

Thereafter, the person detector 22 may determine whether the moving method of the person is walking (step S108). For example, the person detector 22 may determine whether the moving method of the person is walking based on the captured images supplied from the imaging unit 14 of the vehicle 10A.

In step S108, if the moving method of the person is walking ("Y" in step S108), the notification data generator 24 may register the information that the moving method is "walking" to the notification data DT (step S109).

Thereafter, the person detector 22 may perform a height estimating process of estimating a height of the person (step S110). For example, the person detector 22 may perform the height estimating process based on the captured images supplied from the imaging unit 14 of the vehicle 10A.

Thereafter, the person detector 22 may determine whether the height of the person is successfully estimated in step S110 (step S111). That is, for example, it is difficult for the person detector 22 to estimate the height of the person based on, for example, captured images obtained at night hours, captured images obtained in a bad weather, and captured images obtained in a backlight environment each having a slightly low image quality. Furthermore, for example, if the person is far away, it is difficult for the person detector 22 to estimate the height of the person because the image of the person can be small. Furthermore, for example, if there is an obstacle between the vehicle 10A and the person, it is difficult for the person detector 22 to estimate the height of the person because part of the image of the person can be missing. As described above, it can be difficult to estimate the height of the person in various cases. For this reason, the person detector 22 may determine whether the height of the person is successfully estimated.

If the person detector 22 has successfully estimated the height of the person ("Y" in step S111), the person detector 22 may estimate the moving speed based on the height of the person estimated in step S110, and the notification data generator 24 may register the height of the person to the notification data DT (step S112). For example, it is possible for the person detector 22 to set the moving speed of the person to a walking speed of a typical adult if the height of the person is greater than or equal to a threshold and set the moving speed of the person to a walking speed of a typical child if the height of the person is less than the threshold. In other words, it is possible for the person detector 22 to set the moving speed of the person to a fast moving speed if the height of the person is greater than or equal to the threshold and set the moving speed of the person to a slow moving speed if the height of the person is less than the threshold. Note that this example is a non-limiting example, and the person detector 22 may set the moving speed in more detail in accordance with the height of the person. Thereafter, the flow may proceed to step S124.

If the person detector 22 has not successfully estimated the height of the person ("N" in step S111), the person detector 22 may set the moving speed of the person to a predetermined moving speed V1 (step S113). The moving speed V1 may be, for example, a walking speed of a typical adult. Thereafter, the flow may proceed to step S124.

In step S108, if the moving method of the person is not walking ("N" in step S108), the person detector 22 may determine whether the moving method of the person is a bicycle (step S114). For example, the person detector 22 may determine whether the moving method of the person is the bicycle based on the captured images supplied from the imaging unit 14 of the vehicle 10A. If the moving method of the person is the bicycle ("Y" in step S114), the notification data generator 24 may register the information that the moving method is the "bicycle" to the notification data DT (step S115). Thereafter, the person detector 22 may set the moving speed of the person to a predetermined moving speed V2 (step S116). The moving speed V2 may be, for example, a traveling speed of a typical bicycle and faster than the moving speed V1. Thereafter, the flow may proceed to step S124.

In step S114, if the moving method of the person is not the bicycle ("N" in step S114), the person detector 22 may determine whether the moving method of the person is a mobility scooter (step S117). For example, the person detector 22 may determine whether the moving method of the person is the mobility scooter based on the captured images supplied from the imaging unit 14 of the vehicle 10A. If the moving method of the person is the mobility scooter ("Y" in step S117), the notification data generator 24 may register the information that the moving method is the "mobility scooter" to the notification data DT (step S118). Thereafter, the person detector 22 may set the moving speed of the person to a predetermined moving speed V3 (step S119). The moving speed V3 may be, for example, a traveling speed of a typical mobility scooter and faster than the moving speed V1. Thereafter, the flow may proceed to step S124.

In step S117, if the moving method of the person is not the mobility scooter ("N" in step S117), the person detector 22 may determine whether the moving method of the person is any board such as a skateboard (step S120). For example, the person detector 22 may determine whether the moving method of the person is any board based on the captured images supplied from the imaging unit 14 of the vehicle 10A. If the moving method of the person is any board ("Y" in step S120), the notification data generator 24 may register the information that the moving method is "any board" to the notification data DT (step S121). Thereafter, the person detector 22 may set the moving speed of the person to a predetermined moving speed V4 (step S122). The moving speed V4 may be, for example, a traveling speed of a typical skateboard and faster than the moving speed V1. Thereafter, the flow may proceed to step S124.

In step S120, if the moving method of the person is not any board ("N" in step S120), the person detector 22 may set the moving speed of the person to a predetermined moving speed V5 (step S123). Thereafter, the flow may proceed to step S124.

Thereafter, the person detector 22 may perform a distance estimating process of estimating the distance between the vehicle 10A and the person (step S124). For example, the person detector 22 may estimate the distance between the vehicle 10A and the person based on the captured images supplied from the imaging unit 14 of the vehicle 10A. In a case where the imaging unit 14 is a stereo camera, it is possible for the person detector 22 to estimate the distance between the vehicle 10A and the person based on a parallax in a stereo image obtained by the stereo camera. Furthermore, in a case where the imaging unit 14 is a monocular camera, it is possible for the person detector 22 to estimate the distance between the vehicle 10A and the person based on the captured images and the data regarding the position supplied from the navigator 11. Although not illustrated, for example, in a case where the vehicle 10A includes a LiDAR sensor, it is possible for the person detector 22 to estimate the distance between the vehicle 10A and the person based on the detection result of the sensor.

Thereafter, the person detector 22 may determine whether the distance between the vehicle 10A and the person is successfully estimated in step S124 (step S125). That is, for example, it is difficult for the person detector 22 to estimate the distance based on, for example, captured images obtained at night hours, captured images obtained in a bad weather, and captured images obtained in a backlight environment each having a slightly low image quality. Furthermore, for example, it is difficult for the person detector 22 to estimate the distance if the person is far away because a measurement accuracy can be decreased. Furthermore, for example, if there is an obstacle between the vehicle 10A and the person, it is difficult for the person detector 22 to estimate the distance because part of the image of the person can be missing. As described above, it can be difficult to estimate the distance in various cases. Thus, the person detector 22 may determine whether the distance is successfully estimated in step S124. If the distance is not successfully estimated ("N" in step S125), this process may end.

If the distance between the vehicle 10A and the person is successfully estimated ("Y" in step S125), the person detector 22 may perform a face detecting process of detecting the face of the person (step S126). For example, the person detector 22 may perform the face detecting process by determining whether an image of the face of the person is included based on the captured images supplied from the imaging unit 14 of the vehicle 10A.

Figure 5A:
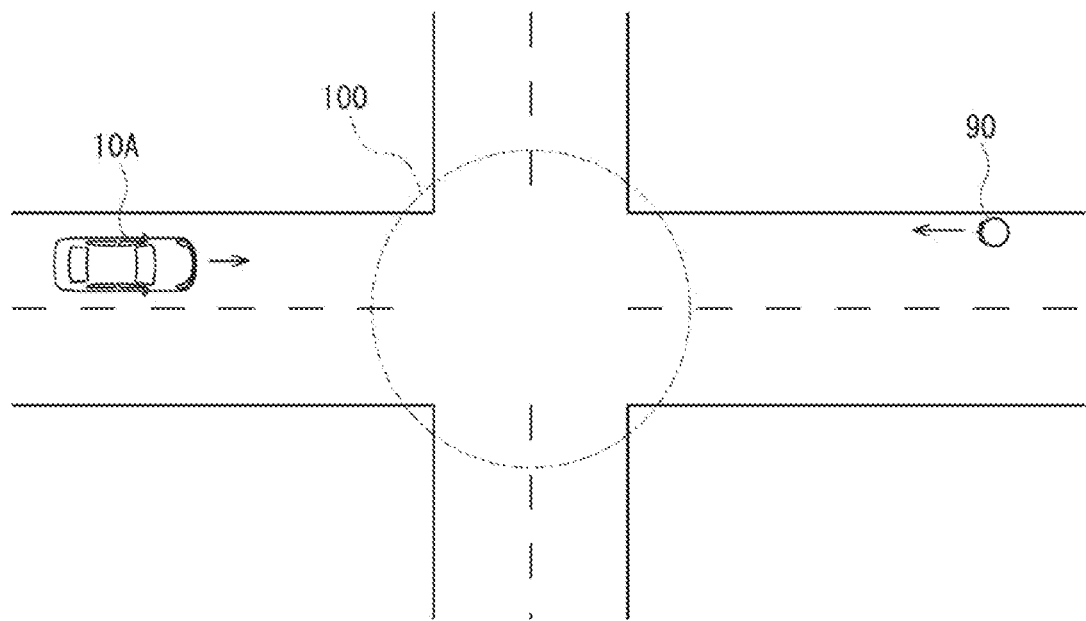
FIG. 5A is another explanatory diagram illustrating an example operation of the vehicle external environment detection system illustrated in FIG. 1.

If the person detector 22 has detected the face of the person in step S126 ("Y" in step S126), the notification data generator 24 may register the information that a moving direction of the person is toward the vehicle 10A to the notification data DT (step S128). That is, as illustrated in FIG. 5A, if the person detector 22 has detected the face of the person 90, the person 90 may be facing toward the vehicle 10A. Thus, the notification data generator 24 may register the information that the moving direction of the person 90 is in a direction toward the vehicle 10A to the notification data DT. Thereafter, the flow may proceed to step S130.

Figure 5B:
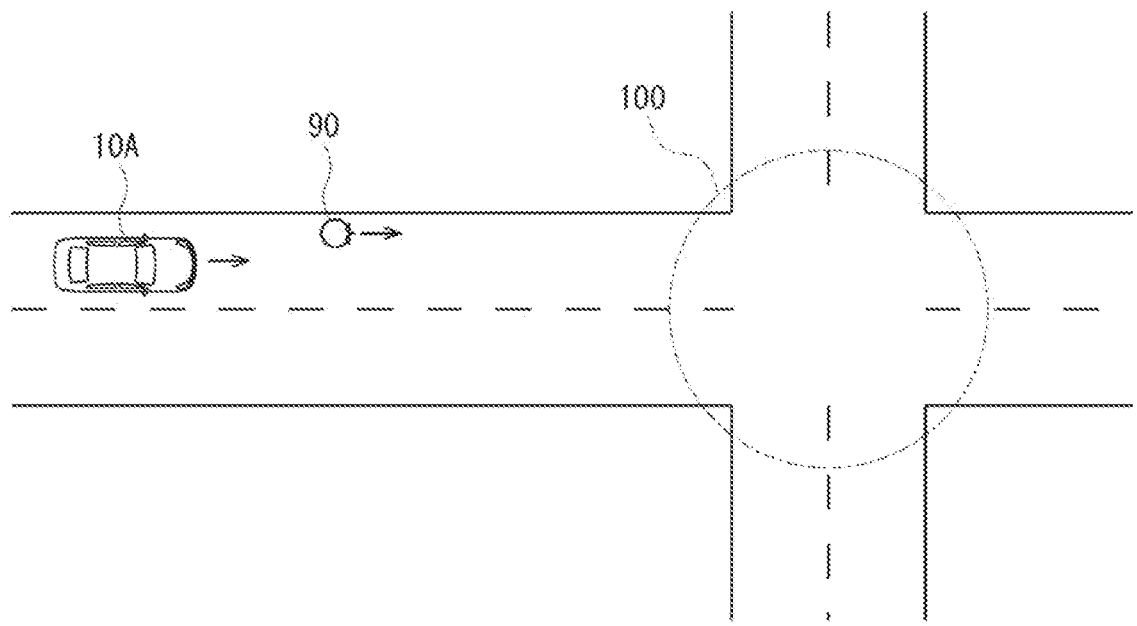
FIG. 5B is another explanatory diagram illustrating an example operation of the vehicle external environment detection system illustrated in FIG. 1.

Furthermore, if the person detector 22 has not detected the face of the person in step S127 ("N" in step S127), the notification data generator 24 may register the information that the moving direction of the person is in a direction away from the vehicle 10A to the notification data DT (step S129). That is, as illustrated in FIG. 5B, if the person detector 22 has not detected the face of the person 90, the person 90 may be facing in a direction opposite to a direction toward the vehicle 10A. Thus, the notification data generator 24 may register the information that the moving direction of the person 90 is in a direction away from the vehicle 10A to the notification data DT. Thereafter, the flow may proceed to step S130.

Thereafter, the arrival time estimator 23 may perform a distance estimating process of estimating a distance between the vehicle 10A and the intersection (step S130). For example, the arrival time estimator 23 may estimate the distance between the vehicle 10A and the intersection based on the data regarding the position of the vehicle 10A and the position of the intersection supplied from the navigator 11.

Thereafter, the arrival time estimator 23 may calculate the distance between the person and the intersection, and the notification data generator 24 may register the calculated distance to the notification data DT (step S131). For example, the arrival time estimator 23 may calculate the distance between the person and the intersection by calculating a difference between the distance between the vehicle 10A and the person obtained by the person detector 22 in step S124 and the distance between the vehicle 10A and the intersection obtained by the arrival time estimator 23 in step S130. Thereafter, the notification data generator 24 may register the calculated distance to the notification data DT.

Thereafter, the arrival time estimator 23 may estimate the arrival time at which the person arrives at the intersection, and the notification data generator 24 may register the estimated arrival time to the notification data DT (step S132). For example, the arrival time estimator 23 may divide the distance between the person and the intersection obtained in step S131 by the moving speed of the person obtained in any of steps S112, S113, S116, S119, S122, and S123 to thereby calculate the time to be taken by the person to arrive at the intersection from a current time. The arrival time estimator 23 may calculate the arrival time at which the person arrives at the intersection based on the calculation result and the current time. Thereafter, the notification data generator 24 may register the calculated arrival time to the notification data DT.

Thereafter, the notification data generator 24 may register a traveling direction of the vehicle 10A to the notification data DT (step S133). For example, the notification data generator 24 may calculate an azimuth angle of the traveling direction of the vehicle 10A on a map based on the data regarding the position of the vehicle 10A supplied from the navigator 11. The notification data generator 24 may register the calculated azimuth angle of the traveling direction to the notification data DT. In the azimuth angle, for example, the north direction may be defined as 0 degrees, the east direction as 90 degrees, the south direction as 180 degrees, and the west direction as 270 degrees.

Thereafter, the notification data generator 24 may register identification information of the intersection to the notification data DT (step S134). For example, the notification data generator 24 may register, to the notification data DT, the identification information that is supplied from the navigator 11 and makes it possible to identify the intersection detected in step S102. The identification information of the intersection may be, for example, latitude and longitude coordinate data of the intersection on the map or may be an identifier allocated to the intersection.

The communicator 15 may transmit the notification data DT to a vehicle around the vehicle 10A (step S135).

This may be the end of this flow.

FIG. 6 illustrates an example configuration of the notification data DT.

For example, in step S109, when the notification data generator 24 registers the information that the moving method is "walking" to the notification data DT, a parameter of "Moving method: walking" in the notification data DT may be set to "01". In this case, for example, in step S112, when the notification data generator 24 registers the height of the person to the notification data DT, a parameter of "Height" in the notification data DT may be set to the height (in this example, 180 cm) of the person.

For example, in step S114, when the notification data generator 24 registers the information that the moving method is the "bicycle" to the notification data DT, a parameter of "Moving method: bicycle" in the notification data DT may be set to "01". For example, in step S118, when the notification data generator 24 registers the information that the moving method is the "mobility scooter" to the notification data DT, a parameter of "Moving method: mobility scooter" in the notification data DT may be set to "01". For example, in step S121, when the notification data generator 24 registers the information that the moving method is "any board" to the notification data DT, a parameter of "Moving method: any board" in the notification data DT may be set to "01".

For example, in step S128, when the notification data generator 24 registers the information that the moving direction of the person is a direction toward the vehicle 10A to the notification data DT, a parameter of "Moving direction of person" in the notification data DT may be set to "01". For example, in step S129, when the notification data generator 24 registers the information that the moving direction of the person is a direction away from the vehicle 10A to the notification data DT, the parameter of "Moving direction of person" in the notification data DT may be set to "02".

For example, in step S131, when the notification data generator 24 registers the distance between the person and the intersection to the notification data DT, a parameter of "Distance between person and intersection" in the notification data DT may be set to that distance (in this example, 30 m).

For example, in step S132, when the notification data generator 24 registers the arrival time at which the person arrives at the intersection to the notification data DT, a parameter of "Arrival time of person" in the notification data DT may be set to that time (in this example, 16:01:45:10, June 3, 2022).

For example, in step S133, when the notification data generator 24 registers the traveling direction of the vehicle 10A to the notification data DT, a parameter of "Traveling direction of vehicle 10A" in the notification data DT may be set to that traveling direction (in this example, 90 degrees). Here, 90 degrees may indicate that the traveling direction is toward the east.

For example, in step S134, when the notification data generator 24 registers the identification information of the intersection to the notification data DT, a parameter of "Identification information of intersection" in the notification data DT may be set to the latitude and the longitude of the intersection in this example.

<Operation of Vehicle 10B>

Figure 7:
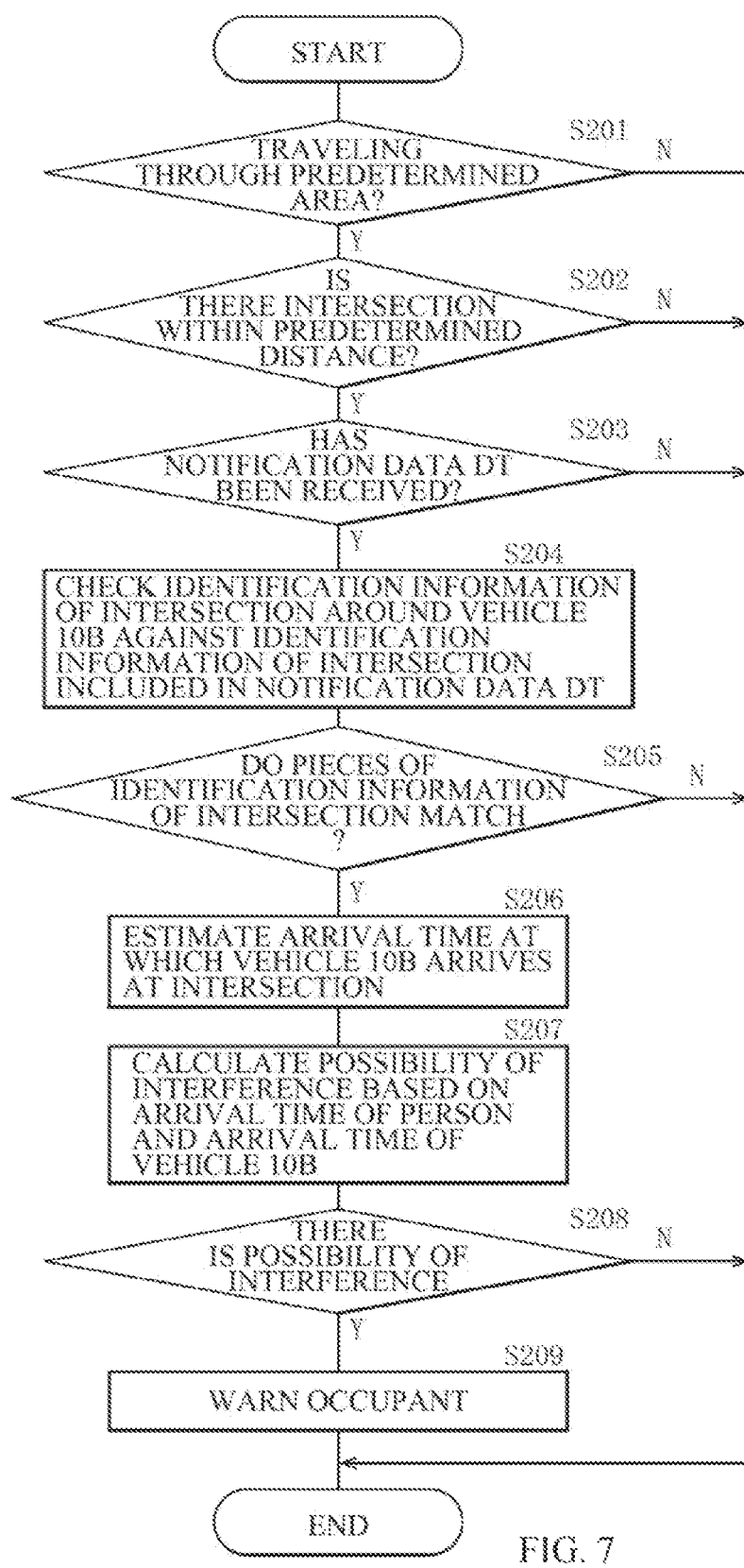
FIG. 7 is another flowchart illustrating an example operation of the vehicle external environment detection system illustrated in FIG. 1.

FIG. 7 illustrates an example operation of the vehicle 10B. The vehicle 10B may repeat the processes illustrated in FIG. 7, for example, several times per second.

First, the intersection detector 21 may determine whether the vehicle 10B is traveling through a predetermined area (step S201). For example, the intersection detector 21 may determine whether the vehicle 10B is traveling through an area, such as an urban area, where there is a high possibility that a person and a vehicle interfere with each other at an intersection, based on the data regarding the position of the vehicle 10B supplied from the navigator 11. If the vehicle 10B is not traveling through the predetermined area ("N" in step S201), this process may end.

In step S201, if the vehicle 10B is traveling through the predetermined area ("Y" in step S201), the intersection detector 21 may determine whether there is an intersection in a region within a predetermined distance from the vehicle 10B (step S202). For example, the intersection detector 21 may determine whether there is an intersection in the region within the predetermined distance from the vehicle 10B based on the data regarding the position of the vehicle 10B and the position of the intersection around the vehicle 10B supplied from the navigator 11. If there is no intersection in the region within the predetermined distance from the vehicle 10B ("N" in step S202), this process may end.

In step S202, if there is an intersection in the region within the predetermined distance from the vehicle 10B ("Y" in step S202), the communicator 15 may determine whether the notification data DT has been received (step S203). If the communicator 15 has not received the notification data DT ("N" in step S203), this process may end.

In step S203, if the communicator 15 has received the notification data DT ("Y" in step S203), the intersection detector 21 may check the identification information of the intersection around the vehicle 10B against the identification information of the intersection included in the notification data DT (step S204). For example, the intersection detector 21 may check the identification information supplied from the navigator 11 and regarding the intersection detected in step S202 against the identification information of the intersection included in the notification data DT. If these pieces of identification information do not match each other ("N" in step S205), this process may end.

If these pieces of identification information match each other ("Y" in step S205), the interference possibility estimator 25 may estimate the arrival time at which the vehicle 10B arrives at the intersection (step S206). For example, first, the interference possibility estimator 25 may estimate the distance between the vehicle 10B and the intersection based on the data regarding the position of the vehicle 10B and the position of the intersection supplied from the navigator 11. Thereafter, the interference possibility estimator 25 may divide the distance between the vehicle 10B and the intersection by the traveling speed of the vehicle 10B to thereby calculate the time to be taken by the vehicle 10B to arrive at the intersection from the current time. Thereafter, the interference possibility estimator 25 may calculate the arrival time at which the vehicle 10B arrives at the intersection based on the calculation result and the current time.

Thereafter, the interference possibility estimator 25 may calculate the possibility of interference based on the arrival time at which the person arrives at the intersection and the arrival time at which the vehicle 10B arrives at the intersection (step S207). For example, the interference possibility estimator 25 may calculate the possibility of interference between the vehicle 10B and the person based on a matching degree of the arrival time at which the person arrives at the intersection included in the notification data DT and the arrival time at which the vehicle 10B arrives at the intersection estimated in step S206. The interference possibility estimator 25 may determine that there is a possibility that the vehicle 10B interferes with the person when, for example, the difference between these arrival times is less than or equal to a predetermined time period. If there is no possibility of interference ("N" in step S208), this process may end.

In step S208, if there is a possibility of interference ("Y" in step S208), the warning processor 26 may warn the occupant on the vehicle 10B (step S209). For example, the warning processor 26 may inform the occupant on the vehicle 10B of various pieces of information included in the notification data DT using the user interface 16 to thereby warn the occupant on the vehicle 10B that there is a possibility of interference with the person.

For example, the warning processor 26 may inform the occupant on the vehicle 10B of the moving method of the person. For example, the warning processor 26 may inform that a pedestrian is entering the intersection when the parameter of "Moving method: walking" is "01" in the notification data DT. The same applies to a case in which the moving method of the person is the bicycle, a case in which the moving method of the person is the mobility scooter, and a case in which the moving method of the person is any board. This makes it possible for the occupant on the vehicle 10B to grasp the moving method of the person with whom the vehicle 10B can interfere and to be particularly careful about not to interfere with that person.

Furthermore, it is possible for the warning processor 26 to inform the occupant on the vehicle 10B whether the person is a child or an adult. For example, when the parameter of "Height" in the notification data DT is less than a predetermined value, the warning processor 26 may inform that a child will enter the intersection. This makes it possible for the occupant on the vehicle 10B to grasp that the person with whom the vehicle 10B can interfere is a child and to be particularly careful about not to interfere with the child who may, for example, suddenly rush out.

Furthermore, it is possible for the warning processor 26 to inform the occupant on the vehicle 10B of the direction from which the person may enter the intersection.

Figure 8:
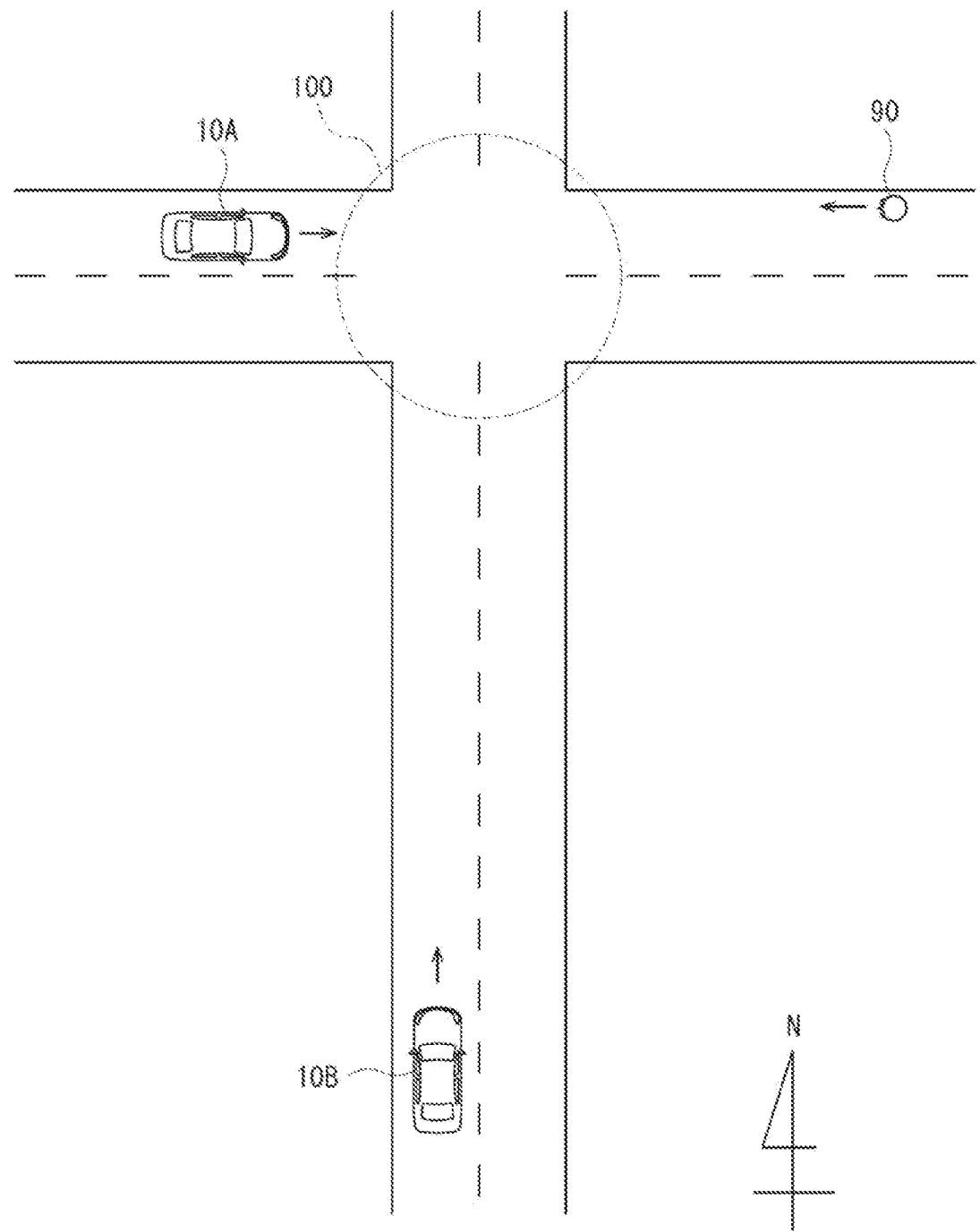
FIG. 8 is another explanatory diagram illustrating an example operation of the vehicle external environment detection system illustrated in FIG. 1.

FIG. 8 illustrates an example operation of the vehicle external environment detection system 1. In this example, in the notification data DT transmitted from the vehicle 10A, the parameter of "Traveling direction of vehicle 10A" may be "90 degrees", and the parameter of "Moving direction of person" may be "01". Because the parameter of "Traveling direction of vehicle 10A" is "90 degrees", the warning processor 26 of the vehicle 10B may determine that the vehicle 10A is traveling toward the east. Because the parameter of "Moving direction of person" is "01", and thus the person is moving toward the vehicle 10A, the warning processor 26 may determine that the person is traveling toward the west. As a result, the warning processor 26 of the vehicle 10B may inform the occupant on the vehicle 10B that the person will enter the intersection from the east. In this example, because the vehicle 10B is traveling toward the north, it is possible for the warning processor 26 to inform that the person will enter the intersection from the right at the intersection ahead of the vehicle 10B. This makes it possible for the occupant on the vehicle 10B to grasp that the person with whom the vehicle 10B can interfere may enter the intersection from the right and to be particularly careful about not to interfere with the person entering the intersection from the right.

Furthermore, it is possible for the warning processor 26 to inform the occupant on the vehicle 10B how far a position of the person is from the intersection. For example, when the parameter of "Distance between person and intersection" is "30 m" in the notification data DT, the warning processor 26 may inform that the person is at a position 30 m away from the intersection. As illustrated in FIG. 8, when the person is moving toward the west, it is possible for the warning processor 26 to inform that the person is at the position 30 m away in the east from the intersection ahead of the vehicle 10B. This makes it possible for the occupant on the vehicle 10B to grasp the position of the person with whom the vehicle 10B can interfere and to be particularly careful about not to interfere with that person.

Furthermore, it is possible for the warning processor 26 to determine the level based on the difference between the arrival time at which the person arrives at the intersection and the arrival time at which the vehicle 10B arrives at the intersection and give a warning in accordance with the level. For example, it is possible for the warning processor 26 to more strongly warn the occupant on the vehicle 10B as the difference between the arrival times becomes smaller.

This may be the end of this flow.

Figure 9:
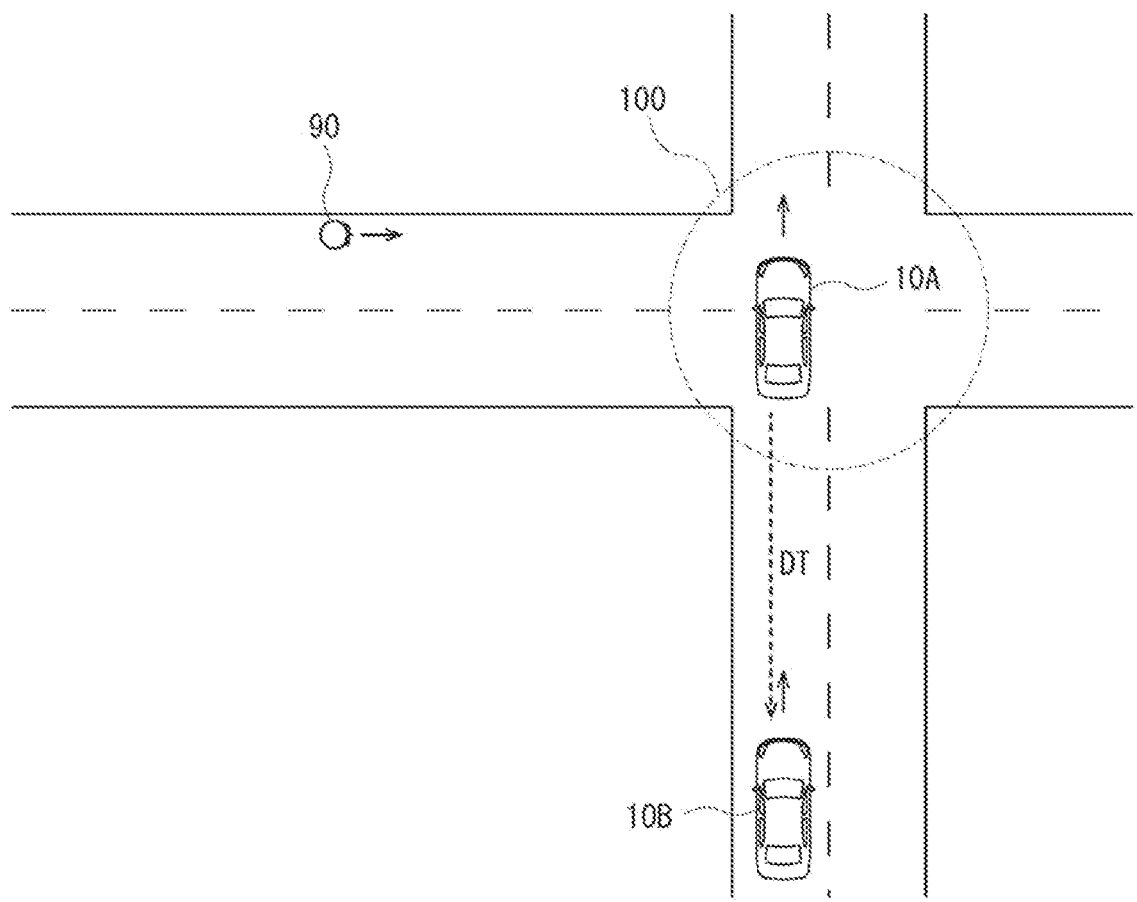
FIG. 9 is another explanatory diagram illustrating an example operation of the vehicle external environment detection system illustrated in FIG. 1.
Figure 10:
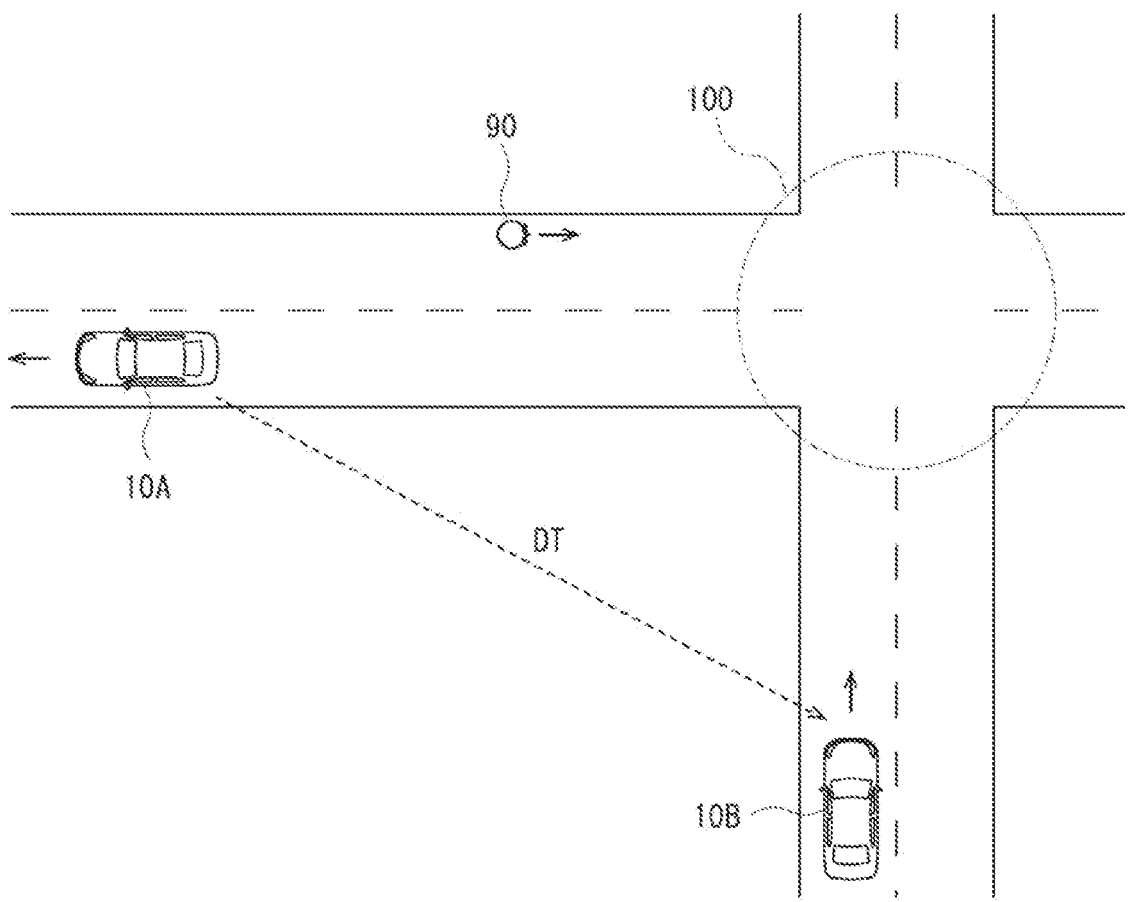
FIG. 10 is another explanatory diagram illustrating an example operation of the vehicle external environment detection system illustrated in FIG. 1.

Note that in this example, as illustrated in FIG. 2, a description is given of an example in which the vehicle 10A detects the person 90 ahead of the vehicle 10A; however, this example is a non-limiting example. In some embodiments, the imaging unit 14 of the vehicle 10A may include a camera that captures images of a region sideways of the vehicle 10A. In this case, it is possible for the vehicle 10A to detect the person 90 located sideways of the vehicle 10A as illustrated in FIG. 9. Thereafter, the vehicle 10A may estimate the time (the arrival time) at which the person 90 arrives at the intersection 100 and transmit the notification data DT including data on the arrival time to a vehicle (for example, the vehicle 10B) around the vehicle 10A. Furthermore, in some embodiments, the imaging unit 14 of the vehicle 10A may include a camera that captures images of a region rearward of the vehicle 10A. In this case, it is possible for the vehicle 10A to detect the person 90 located rearward of the vehicle 10A as illustrated in FIG. 10. Thereafter, the vehicle 10A may estimate the time (the arrival time) at which the person 90 arrives at the intersection 100 and transmit the notification data DT including data on the arrival time to a vehicle (for example, the vehicle 10B) around the vehicle 10A.

Furthermore, a description is given of a case in which the vehicle 10A performs the processes illustrated in FIGS. 4A to 4D, and the vehicle 10B performs the process illustrated in FIG. 7. However, in reality, the vehicle 10A may also perform a process similar to that illustrated in FIG. 7 in addition to the processes illustrated in FIGS. 4A to 4D. Furthermore, the vehicle 10B may also perform processes similar to those illustrated in FIGS. 4A to 4D in addition to the process illustrated in FIG. 7. This makes it possible, for example, for the vehicle 10B to detect the person 90 and generate the notification data DT and for the vehicle 10A to warn an occupant based on the notification data DT.

The vehicle external environment detection system 1 according to the example embodiment includes the first vehicle (the vehicle 10A) and the second vehicle (the vehicle 10B). The first vehicle (the vehicle 10A) includes the image sensor (the imaging unit 14), the first processing circuit (the processor 20), and the first communication circuit (the communicator 15). The image sensor (the imaging unit 14) is configured to perform imaging of the surrounding region. The first processing circuit (the processor 20) is configured to identify the moving method of the person around the first vehicle (the vehicle 10A) based on a result of the imaging performed by the image sensor (the imaging unit 14), estimate the moving speed of the person based on the moving method, and calculate the arrival time at which the person arrives at the intersection based on the moving speed of the person. The first communication circuit (the communicator 15) is configured to transmit the notification data DT including the data regarding the arrival time. The second vehicle (the vehicle 10B) includes the second communication circuit (the communicator 15) and the second processing circuit (the processor 20). The second communication circuit (the communicator 15) is configured to receive the notification data DT. The second processing circuit (the processor 20) is configured to calculate the possibility of interference between the second vehicle (the vehicle 10B) and the person based on the data regarding the arrival time included in the notification data DT and warn the occupant on the second vehicle (the vehicle 10B) when the possibility of interference is high. Thus, in the vehicle external environment detection system 1, even when, for example, it is difficult for the vehicle 10B that is entering the intersection with bad visibility to directly detect the person near the intersection, it is possible for the vehicle 10B to grasp the existence of the person based on the notification data DT transmitted from the vehicle 10A. This makes it possible for the vehicle external environment detection system 1 to detect the vehicle external environment more appropriately.

In some embodiments, when the moving method is walking, the first processing circuit (the processor 20) of the first vehicle (the vehicle 10A) may estimate that the moving speed is a first moving speed. When the moving method is, for example, a micromobility vehicle such as a bicycle, a mobility scooter, or any board, the first processing circuit (the processor 20) of the first vehicle (the vehicle 10A) may estimate that the moving speed is a second moving speed faster than the first moving speed. Thus, even when it is difficult to accurately estimate the position of the person such as in a case where the image quality of the captured images is low, a case where the person is at a position far from the vehicle 10A, or a case where there is an obstacle between the vehicle 10A and the person, it is possible for the vehicle external environment detection system 1 to estimate the moving speed of the person. The vehicle external environment detection system 1 may estimate the arrival time using the moving speed estimated as above. This helps to improve an estimation accuracy of the arrival time compared with a case where the arrival time is estimated using a predetermined moving speed regardless of the moving method. This makes it possible for the vehicle external environment detection system 1 to detect the vehicle external environment more appropriately.

In some embodiments, when the moving method is walking, the first processing circuit (the processor 20) of the first vehicle (the vehicle 10A) may detect the height of the person and estimate the moving speed of the person based on the height of the person. This makes it possible for the vehicle external environment detection system 1 to, for example, set the moving speed slow when the person is a child and set the moving speed fast when the person is an adult. The vehicle external environment detection system 1 may estimate the arrival time using the moving speed estimated as above. This helps to improve the estimation accuracy of the arrival time compared with a case where the arrival time is estimated using a predetermined moving speed regardless of the height. This makes it possible for the vehicle external environment detection system 1 to detect the vehicle external environment more appropriately.

In some embodiments, the first processing circuit (the processor 20) of the first vehicle (the vehicle 10A) may be configured to detect the moving direction of the person. The notification data DT may include the data regarding the moving direction of the person. The second processing circuit (the processor 20) of the second vehicle (the vehicle 10B) may warn the occupant while providing information regarding the direction in which the person enters the intersection, based on the data regarding the moving direction of the person included in the notification data DT. For example, according to the example illustrated in FIGS. 6 and 8, in the notification data DT, the parameter of "Moving direction of person" may indicate that the person is moving toward the vehicle 10A, and the parameter of "Traveling direction of vehicle 10A" may indicate that the vehicle 10A is moving toward the east. Thus, it is possible for the processor 20 of the vehicle 10B to determine that the person is moving toward the west based on the notification data DT and inform the occupant on the vehicle 10B that the person will enter the intersection from the east to thereby warn the occupant on the vehicle 10B. This makes it possible for the vehicle external environment detection system 1 to detect the vehicle external environment more appropriately and inform the occupant of the vehicle external environment appropriately.

Example Effects

According to the foregoing example embodiment, the first vehicle and the second vehicle are provided. The first vehicle includes the image sensor, the first processing circuit, and the first communication circuit. The image sensor is configured to perform imaging of the surrounding region. The first processing circuit is configured to identify the moving method of the person around the first vehicle based on a result of the imaging performed by the image sensor, estimate the moving speed of the person based on the moving method, and calculate the arrival time at which the person arrives at the intersection based on the moving speed of the person. The first communication circuit is configured to transmit the notification data including the data regarding the arrival time. The second vehicle includes the second communication circuit and the second processing circuit. The second communication circuit is configured to receive the notification data. The second processing circuit is configured to calculate the possibility of interference between the second vehicle and the person based on the data regarding the arrival time included in the notification data and warn the occupant of the second vehicle when the possibility of interference is high. This helps to detect the vehicle external environment more appropriately.

In some embodiments, when the moving method is walking, the first processing circuit of the first vehicle may estimate that the moving speed is the first moving speed. When the moving method is a micromobility vehicle, the first processing circuit of the first vehicle may estimate that the moving speed is the second moving speed faster than the first moving speed. This helps to detect the vehicle external environment more appropriately.

In some embodiments, when the moving method is walking, the first processing circuit of the first vehicle may detect the height of the person and estimate the moving speed of the person based on the height of the person. This helps to detect the vehicle external environment more appropriately.

In some embodiments, the first processing circuit of the first vehicle may be configured to detect the moving direction of the person, the notification data may include the data regarding the moving direction of the person, and the second processing circuit of the second vehicle may warn the occupant while providing information regarding the direction in which the person enters the intersection, based on the data regarding the moving direction of the person included in the notification data. This makes it possible for the vehicle external environment detection system 1 to detect the vehicle external environment more appropriately and inform the occupant of the vehicle external environment appropriately.

Modification 1

Figure 11:
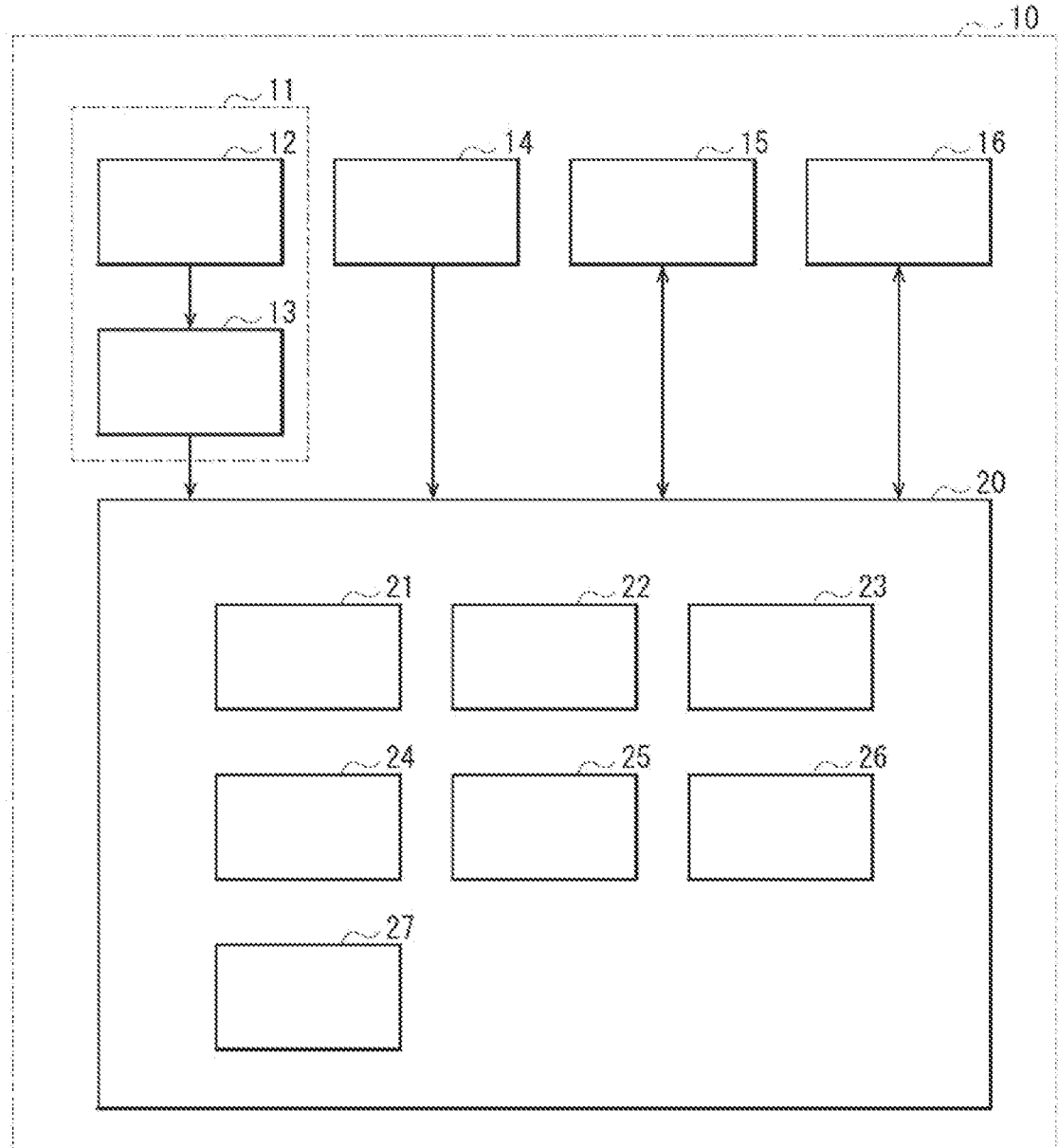
FIG. 11 is a block diagram illustrating an example configuration of a vehicle according to a modification.

In the above-described example embodiment, the vehicle 10 may be configured to warn the occupant on the vehicle 10 if the possibility (the possibility of interference) that the vehicle 10 interferes with the person is high; however, this example is a non-limiting example. In some embodiments, like the vehicle 10 illustrated in FIG. 11, braking of the vehicle 10 may further be controlled. The vehicle 10 may include the processor 20. The processor 20 may include a travel control processor 27. The travel control processor 27 may be configured to control traveling of the vehicle 10 if the possibility of interference calculated by the interference possibility estimator 25 is high. For example, the travel control processor 27 may be configured to decelerate the vehicle 10 if the possibility of interference calculated by the interference possibility estimator 25 is high. In some embodiments, the travel control processor 27 may further control steering in addition to the braking.

Modification 2

In the above-described example embodiment, as illustrated in FIG. 6, the moving direction of the person may be defined by a relative direction as viewed from the vehicle 10A, and the notification data DT may include the parameter of "Moving direction of person" and the parameter of "Traveling direction of vehicle 10A"; however, this example is a non-limiting example. In some embodiments, as illustrated in FIG. 12, the moving direction of the person may be defined by the azimuth angle on the map. For example, in the example illustrated in FIG. 6, the parameter of "Moving direction of person" may indicate that the person is moving toward the vehicle 10A, and the parameter of "Traveling direction of vehicle 10A" may indicate that the vehicle 10A is traveling toward the east. This may indicate that the person is moving toward the west. Thus, in the example of FIG. 12, the parameter of "Moving direction of person" may be set to an azimuth angle of "270 degrees" indicating the west direction. For example, it is possible for the person detector 22 of the vehicle 10A to calculate the azimuth angle of the moving direction of the person based on the moving direction of the person obtained in steps S126 to S129 and the traveling direction of the vehicle 10A obtained in step S133 and for the notification data generator 24 to register the azimuth angle of the moving direction of the person to the notification data DT.

Other Modification Examples

Note that any two or more of these modifications may be combined with each other.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, the notification data DT illustrated in FIG. 6 may be an example, and some of the pieces of data may be omitted, or other pieces of data may be added.

The example effects described herein are mere examples, and example effects of the disclosure are therefore not limited to those described herein. Accordingly, the disclosure may achieve any other example effects.

Furthermore, the disclosure encompass at least the following embodiments.

(1) A vehicle external environment detection system including:
    a first vehicle including
        an image sensor configured to perform imaging of a surrounding region,
        a first processing circuit configured to identify a moving method of a person around the first vehicle based on a result of the imaging performed by the image sensor, estimate a moving speed of the person based on the moving method, and calculate an arrival time at which the person arrives at an intersection based on the moving speed of the person, and
        a first communication circuit configured to transmit notification data including data regarding the arrival time; and
    a second vehicle including
        a second communication circuit configured to receive the notification data, and
        a second processing circuit configured to calculate a possibility of interference between the second vehicle and the person based on the data regarding the arrival time included in the notification data and warn an occupant on the second vehicle when the possibility of interference is high.

(2) The vehicle external environment detection system according to (1), in which
    the first processing circuit is configured to
    estimate that the moving speed comprises a first moving speed when the moving method is walking, and
    estimate that the moving speed comprises a second moving speed faster than the first moving speed when the moving method is a micromobility vehicle.

(3) The vehicle external environment detection system according to (1) or (2), in which
the first processing circuit is configured to
detect a height of the person when the moving method is walking, and
estimate the moving speed of the person based on the height of the person.
(4) The vehicle external environment detection system according to any one of (1) to (3), in which
the first processing circuit is configured to detect a moving direction of the person,
the notification data includes data regarding the moving direction of the person, and
the second processing circuit is configured to warn the occupant while providing information regarding a direction from which the person enters the intersection, based on the data regarding the moving direction of the person included in the notification data.
(5) A vehicle including:
an image sensor configured to perform imaging of a surrounding region;
a processing circuit configured to identify a moving method of a person around the vehicle based on a result of the imaging performed by the image sensor, estimate a moving speed of the person based on the moving method, and calculate an arrival time at which the person arrives at an intersection based on the moving speed of the person; and
a communication circuit configured to transmit notification data including data regarding the arrival time.

The vehicle external environment detection system and the vehicle according to at least one embodiment of the disclosure make it possible to detect the vehicle external environment more appropriately.

The processor 20 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 20 illustrated in FIG. 3.

The invention claimed is:

1. A vehicle external environment detection system comprising:
a first vehicle comprising
an image sensor configured to perform imaging of a surrounding region,
a first processing circuit configured to identify a moving method of a person around the first vehicle based on a result of the imaging performed by the image sensor, estimate a moving speed of the person based on the moving method, and calculate an arrival time at which the person arrives at an intersection based on the moving speed of the person, and
a first communication circuit configured to transmit notification data comprising data regarding the arrival time; and
a second vehicle comprising
a second communication circuit configured to receive the notification data,
a second processing circuit configured to calculate a possibility of interference between the second vehicle and the person based on the data regarding the arrival time comprised in the notification data, and
a travel control processor configured to, in response to determining that there is the possibility of interference, control at least one of braking and steering of the second vehicle to avoid the interference between the second vehicle and the person.

2. The vehicle external environment detection system according to claim 1, wherein
the first processing circuit is configured to
estimate that the moving speed comprises a first moving speed when the moving method is walking, and
estimate that the moving speed comprises a second moving speed faster than the first moving speed when the moving method is a micromobility vehicle.

3. The vehicle external environment detection system according to claim 1, wherein
the first processing circuit is configured to
detect a height of the person when the moving method is walking, and
estimate the moving speed of the person based on the height of the person.

4. The vehicle external environment detection system according to claim 1, wherein
the first processing circuit is configured to detect a moving direction of the person,
the notification data comprises data regarding the moving direction of the person, and
the second processing circuit is configured to warn an occupant on the second vehicle in response to determining that there is the possibility of interference, while providing information regarding a direction from which the person enters the intersection, based on the data regarding the moving direction of the person comprised in the notification data.

5. A vehicle comprising:
an image sensor configured to perform imaging of a surrounding region;
a processing circuit configured to identify a moving method of a first person around the vehicle based on a result of the imaging performed by the image sensor, estimate a moving speed of the first person based on the moving method, and calculate an arrival time at which the first person arrives at a first intersection based on the moving speed of the first person; and
a communication circuit configured to transmit first notification data regarding the arrival time, and receive, from another vehicle, second notification data regarding an arrival time at which a second person arrives at a second intersection based on a moving speed of the second person,
wherein the processing circuit is further configured to, in response to receiving the second notification data from the another vehicle, calculate a possibility of interference between the another vehicle and the second person based on the second notification data regarding the arrival time, and wherein the vehicle further comprises a travel control processor configured to, in response to determining that there is the possibility of interference, control at least one of braking and steering of the vehicle to avoid the interference between the vehicle and the second person.

* * * * *